(12) United States Patent
De Wet

(10) Patent No.: US 7,063,824 B1
(45) Date of Patent: Jun. 20, 2006

(54) BENEFICIATION OF ZIRCON

(75) Inventor: Willem Johannes De Wet, deceased, late of Pretoria (ZA); by Gert Hendrik Jacobus Coetzee, legal representative, Pretoria (ZA)

(73) Assignee: University of Pretoria (ZA)

( * ) Notice: Subject to any disclaimer, the term of this patent is extended or adjusted under 35 U.S.C. 154(b) by 525 days.

(21) Appl. No.: 10/009,110

(22) PCT Filed: Jun. 6, 2000

(86) PCT No.: PCT/ZA00/00104

§ 371 (c)(1),
(2), (4) Date: Aug. 14, 2002

(87) PCT Pub. No.: WO00/75075

PCT Pub. Date: Dec. 14, 2000

(30) Foreign Application Priority Data

Jun. 7, 1999 (ZA) .................................... 99/3815

(51) Int. Cl.
*C01G 25/06* (2006.01)
(52) U.S. Cl. ............................. 423/71; 423/82; 423/84; 423/85; 423/419.1; 423/544
(58) Field of Classification Search ................ 423/71, 423/82, 84, 85, 419.1, 544
See application file for complete search history.

(56) References Cited

U.S. PATENT DOCUMENTS

| 1,376,161 A | * | 4/1921 | Pugh .......................... 423/79 |
| 3,672,825 A | | 6/1972 | Gambale, et al. |
| 4,746,497 A | * | 5/1988 | Jenkins et al. ................. 423/82 |

FOREIGN PATENT DOCUMENTS

| WO | WO 86/04614 | 8/1986 |
| WO | WO 88/03128 | 5/1988 |

OTHER PUBLICATIONS

Nielson, Ralph, "Zirconium and Zirconium Compounds", *Ullmann's Encyclopedia of Industrial Chemistry*, vol. A, No. 28, pp. 543-567, 1996, no month.

* cited by examiner

*Primary Examiner*—Steven Bos
(74) *Attorney, Agent, or Firm*—McDonnell Boehnen Hulbert & Berghoff

(57) ABSTRACT

This invention relates to a process of treating a zirconium containing product such as zircon. The process comprises providing an alkali fusion decomposed zircon product (AFDZ) formed from reading zircon with a source of alkali metal at elevated temperatures, and treating the AFDZ to form a solid containing hydrated zirconium oxide and/or hydrated zirconium basic carbonate (hereinafter referred to as the hydrated zirconium product). The process further comprises treating the solid hydrated zirconium product to obtain in situ formation of basic zirconium sulphate as a solid thereon. The invention also relates to such a process for producing zircon derived material suitable for pigments and to such a process to produce opacifier material. The invention also relates to products of such processes.

19 Claims, 1 Drawing Sheet

BENEFICIATION OF ZIRCON

TECHNICAL FIELD

Figure 1:
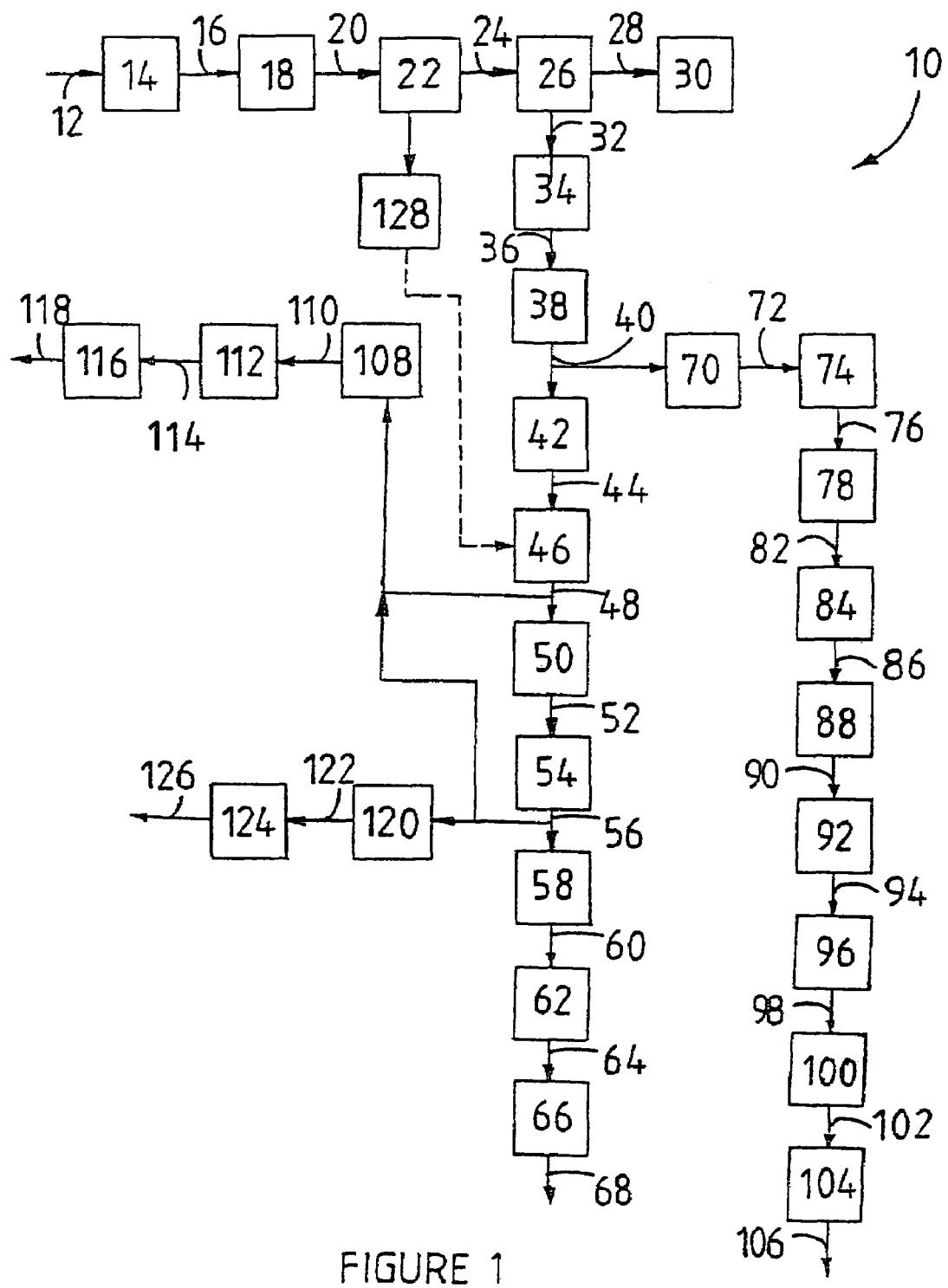

This invention relates to a process of treating zirconium containing products, including beneficiating zircon to increase the zirconium content thereof. The invention also relates to products of such a process including zircon derived material suitable for pigments and including opacifier material.

BACKGROUND ART

Sources of natural baddeleyite ($ZrO_2$) are largely depleted. Zircon sand ($ZrSiO_4$) is another and abundant source of zirconium but is very unreactive. Before zirconium can be retrieved from zircon sand, the zircon sand needs to be thermally or chemically decomposed. Thermal decomposition entails dissociation of zircon in plasmas or melting decomposition in melting furnaces.

Chemical decomposition can be achieved by reacting zircon with a source of alkali metal or a source of alkaline earth metal at elevated temperatures to form a fusion decomposed zircon product wherein the alkali metal or alkaline earth metal is fused with the zircon hereinafter referred to as alkali-fusion decomposed zircon product or AFDZ).

The AFDZ may be treated in a number of ways namely:
i) leaching with water to remove easily soluble alkali metal compounds and silicate values, especially where NaOH was used as the source of alkali metal in producing AFDZ;
ii) treatment with acid to neutralise alkali metal (where a source of alkali metal was used in producing AFDZ) and to form water soluble alkali metal salts and removal thereof by water extraction;
iii) treatment with rather concentrated acids to form water extractable zirconium salts.

A common way of beneficiating zircon comprises reacting zircon with sodium carbonate as a source of alkali metal to form AFDZ. The AFDZ formed is then comminuted, then treated with concentrated HCl and then leached with water to dissolve zirconyl oxychloride ($ZrOCl_2.xH_2O$) which forms in the process. The product is then filtered and sulphate is then added to the filtrate containing the zirconyl oxychloride to precipitate zirconium basic sulphate (hereinafter referred to as ZBS) with the formula $Zr_5O_8(SO_4)_2.xH_2O$ after further dilution and boiling for an extended time. Precipitation is usually from solutions containing 20 to 50 g of equivalent $ZrO_2$ per liter, thus lengthy procedures involving large volumes are required which are disadvantages of this process.

Zircon also has a natural radioactive content with associated occupational health and environmental difficulties, already being experienced by those involved in the fine milling and the destructive processing of zircon, even though its radioactivity content is usually only about 50% of that of acid-leached milled baddeleyite. Waste disposal in zircon processing, as well as final disposal of zircon and related products, are being scrutinised for stricter control for materials with radioactivity equivalents above 10 Beq/g. This may lead to licensing requirements for transport and storage of zircon in addition to labelling of transport containers and also to licensing of plants handling zircon materials. The implication of the foregoing is an increased future demand for zirconia and zirconium products of relatively low radioactivity content.

It is an object of the present invention to overcome or at least reduce some of the above disadvantages.

DESCRIPTION OF THE INVENTION

According to the present invention a process of forming zirconium basic sulphate (hereinafter referred to as ZBS) comprises:
providing an alkali-fusion decomposed zircon product (hereinafter referred to as AFDZ) formed from reacting zircon with a source of alkali metal at elevated temperatures;
treating the AFDZ to form a solid containing hydrated zirconium oxide and/or hydrated zirconium basic carbonate (Hereinafter referred to as the hydrated zirconium product);
treating the solid hydrated zirconium product to obtain in situ formation of ZBS as a solid thereon.

In this specification the term "alkali metal" includes, in addition to its normal meaning, alkali metal ions and compounds including such ions.

The process may also include reacting zircon with a source of alkali metal at elevated temperatures to form the AFDZ. The forming of the AFDZ may take place as set out later on in this specification.

In certain applications the ZBS may be used as formed. Alternatively the ZBS may be purified. A major advantage of this process is that the ZBS may be formed at a very early stage of a purification process. The ZBS is a solid which simplifies further purification in that non-zirconium containing species, including radio active species can be removed from the ZBS containing residue, leaving the ZBS in sold form. In the prior art processes ZBS was only formed after extensive preliminary steps and precipitated from zirconium containing solutions.

In one embodiment of the invention the hydrated zirconium product may be prepared by forming acid zirconium sulphate tetrahydrate, that is $H_2Zr(SO_4)_2O.xH_2O$ (hereinafter referred to as AZST) and thereafter precipitating hydrated zirconium basic carbonate (hereinafter referred to as ZBC) and/or precipitating hydrated zirconium oxide. The hydrated ZBC and hydrated zirconium oxide are both hydrated zirconium products. The AZST may be formed by leaching the AFDZ to provide a leachate containing non-zirconium containing products, and a solid residue; and adding a source of sulphate (preferably $H_2SO_4$) to the solid residue to form the AZST in the solid residue. Alternatively the AZST may be formed by reacting the AFDZ with a source of sulphate (preferably $H_2SO_4$ and preferably excess $H_2SO_4$) to form the AZST in the solid which contained the AFDZ. The AZST that forms in both the above processes is in a solid form which may be dried, preferably at 350° C. The AZST containing solid may then be leached (preferably with water) to extract the AZST into solution. The hydrated ZBC may be formed by adding a carbonate such $Na_2CO_3$ or $(NH_4)_2 CO_3$ to the AZST. The hydrated zirconium oxide may be formed by adding $NH_3$ to the AZST. The hydrated zirconium product(s) which form are preferably washed (preferably with water) to remove soluble sulphates.

Alternatively the hydrated zirconium product may be formed by leaching the AFDZ to provide a leachate containing non-zirconium containing products, and a solid residue with an increased zirconium content containing the hydrated zirconium product.

The solid hydrated zirconium product may be treated with a source sulphate (preferably $H_2SO_4$ or AZST) thereby in situ forming solid ZBS thereon.

According to one aspect of the present invention a process of beneficiating zircon to increase the zirconium content thereof comprises the steps of:

providing an alkali-fusion decomposed zircon product (AFDZ) formed from reacting zircon with a source of alkali metal at elevated temperatures;

leaching the AFDZ to provide a leachate containing non-zirconium containing products, and a solid residue with an increased zirconium content; and treating the residue in order to obtain in situ formation of zirconium basic sulphate (ZBS) as a solid in the residue.

The AFDZ which forms contain acid extractable zirconium which remains in the wet residue which is formed after the leaching step. According to the present process acid extractable zirconium is not extracted as in the prior art, but is in situ converted to solid ZBS, which is not soluble in water. This simplifies purification, in that non-zirconium containing species, including radio active species can be removed from the ZBS containing residue, leaving the ZBS in solid form. Having precipitated the ZBS in situ and in solid form in the residue and treating it as such to remove non-zirconium species ensures that smaller volumes need to be processed (as opposed to where ZBS is precipitated from zirconium species which are in solution).

The process may include the step of forming AFDZ by reacting zircon with a source of alkali metal at elevated temperatures. Preferably the source of alkali metal comprises an alkali metal containing compound and preferably it comprises a sodium containing compound. Preferably, the compound comprises NaOH or $Na_2CO_3$. When the alkali metal containing compound is NaOH, the zircon and NaOH may be allowed to react in a $CO_2$-free atmosphere. As water vapour is released during the reaction of the alkali metal and the zircon, $CO_2$ ingress into a vessel, container, or reactor in which the reaction occurs, is inhibited. It has also been found that a slow stream of air flushed over the contents of a not too tightly covered fusion container prevents $CO_2$ uptake event if fusions takes place in an atmosphere of high $CO_2$ content.

The AFDZ is preferably leached with water. Preferably the leachate contains substantially no zirconium but a portion of the alkali metal from the AFDZ, and preferably it also includes some water soluble alkali metal silicates formed in the AFDZ. The wet residue which forms after the water leaching step usually contains some remaining alkali metal from the AFDZ apart from the zirconium containing species and some unleached silicates.

Without wishing to be bound by theory, the Applicant believes that the alkali-fusion decomposition (alkali metal desilication) reaction of zircon to form AFDZ can be given as follows (for X 2):

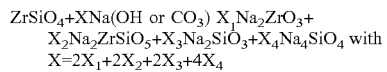

$X=2X_1+2X_2+2X_3+4X_4$ $Na_2SiO_3$ and $Na_4SiO_4$ are relatively easily soluble in water when NaOH is used as the source of the alkali metal, while $Na_2ZrO_3$ and $Na_2ZrSiO_5$ are not soluble in water. When the AFDZ is leached with water, $Na_2SiO_3$ and $Na_4SiO_4$ and NaOH are removed by the water.

Water leachable $SiO_2$ values as percentages are then expected to be equal to $100 (X_3+X_4)$. The Applicant has also found that acid extractable zirconium, as a percentage, is given rather closely by $100 (X_1+\frac{1}{3} X_2)$ for NaOH fusions of zircon at 650° C. At fusion temperatures of 850° C. more zirconium is acid extractable for all mass ratios of zircon: alkali metal than is predicted by this equation. For both NaOH and $Na_2CO_3$ fusions a reversal of this trend is found at fusion temperatures of 1050° C. It is thus clear that towards higher fusion temperatures (above about 900° C.), the fusion products (AFDZ) of alkali metal desilication become more complex.

After initial leaching AFDZ (particularly if formed by using NaOH) with water the zirconium species in the wet residue comprise $ZrO_2.xH_2O$ (from $Na_2ZrO_3$) and (NaH) $yZrSiO_{4+y}$ (from $Na_2ZrSiO_5$). Remaining sodium is neutralised with hydrochloric acid and its salts leached with water.

In order to prepare the ZBS the wet residue is preferably treated with a stoichiometric quantity of $H_2SO_4$, and it is believed that the reaction is as follows:

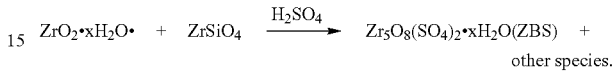

The zircon and the alkali metal containing compound may be mixed in a mass ratio of zircon:alkali metal of between 1:0.4 and 1:1.3. When the alkali metal containing compound is $Na_2CO_3$, the mass ratio is typically between 1:0.4 and 1:0.7 preferably between 1:0.58 and 1:0.66 e.g. about 1:0.65. When the alkali metal containing compound is NaOH, the mass ratio is typically between 1:0.4 and 1:1.1, preferably between 1:0.76 and 1:1.1 e.g. about 1:1. The elevated temperature at which the zircon and the alkali metal containing compound are reacted may be between 450° C. and 1050° C. When the alkali metal containing compound is NaOH, the elevated temperature is preferably between 450° C. and 950° C., and more preferably between 600° C. and 900° C., e.g. about 850° C. When the alkali metal containing compound is $Na_2CO_3$, the elevated temperature is preferably between 900° C. and 1300° C., and more preferably between 950° C. and 1100° C., e.g. about 1000° C.

Typically, the zircon is in particulate form when reacting with the alkali metal containing compound, and the method may thus include subjecting raw zircon to a size reduction step to provide zircon of a suitable particle size. For NaOH as the alkali metal containing compound, a suitable $d_{50}$ particle size for the zircon is between 10 μm and 45 μm. For $Na_2CO_3$ as the alkali metal containing compound a suitable $d_{50}$ particle size for the zircon is between 5 μm and 10 μm. It has been found that a $d_{50}$ particle size of about 6.5 μm provides good results for both NaOH and $Na_2CO_3$ and that larger average particle sizes require higher fusion or reaction temperatures for $Na_2CO_3$ as the alkali metal containing compound.

Prior to subjecting the AFDZ to the leaching step, the AFDZ may be cooled and comminuted. Preferably, the AFDZ is comminuted to a $d_{50}$ particle size of less than 1 mm, more preferably to a $d_{50}$ particle size of between 0.2 mm and 0.8 mm.

The leaching step may be a water leaching or water washing step. When the alkali metal containing compound is NaOH, at least some silica present in the AFDZ will be leached from the AFDZ. Preferably, at least 50% of the silica present in the AFDZ is leached out into the water. More preferably, at least 60% of the silica is leached out into the water, and typically at least 66% of the silica is leached out into the water. Advantageously, sodium silicates or precipitated silicas may be produced from the leachate by methods known to those skilled in the art. However, when the alkali metal containing compound is $Na_2CO_3$, minimal if any silica is leached from the AFDZ into the water. Furthermore, in this water leaching or water washing step, at least about 70% of the alkali metal containing compound initially mixed with the zircon may be leached from the AFDZ, when the alkali metal containing compound is NaOH. Preferably, at least about 80% of the NaOH is leached out into the water. However, when the alkali metal containing compound is $Na_2CO_3$, minimal if any alkali metal is leached from the AFDZ.

The residue formed after the leaching step is wet and usually includes some alkali metal therein. At least some of the alkali metal may be recovered from the wet residue prior to preparing the ZBS. When the alkali containing compound used is NaOH, recovering at least some of the alkali from the wet residue may include mixing $NaHCO_3$ with the wet residue formed after leaching with water and recovering the alkali metal in the form of $Na_2CO_3$ from the mixture. The $NaHCO_3$ may be mixed in a stoichiometric quantity at room temperature with the alkali metal present in the wet residue. The $Na_2CO_3$ recovered may be in the form of a concentrated $Na_2CO_3$ solution from which $Na_2CO_3$ may advantageously be precipitated as $NaHCO_3$ for re-use or be sold as a byproduct. When the alkali metal containing compound is NaOH, about 20% of the alkali metal initially used remains attached to the fusion products after water leaching. It has been found that, when using sodium bicarbonate, alkali losses of less than 3% can be achieved. As will be appreciated, removal of as much alkali metal as possible from the wet residue has a further advantage that less alkali metal salts require removal from the wet residue during treatment of the wet residue to produce the ZBS. A disadvantage is clearly that the processing route is lengthened.

A more elegant way of recovering residual alkali metal from the wet residue is to divide it in two almost equal parts. By adding some water to one of the parts and upon bubbling $CO_2$ through, virtually all the sodium (wherein the alkali metal comprises sodium) present is converted to $NaHCO_3$ which upon mixing with the other part, at room temperature, enables the recovery of most of the sodium as a $Na_2CO_3$ solution. The use of $CO_2$ instead of $NaHCO_3$ avoids addition of further sodium to the wet residue.

Prior to preparing the ZBS the residue is preferably acidified or neutralised, preferably to a pH of between 4 and 6. Acid such as hydrochloric acid or sulphuric acid may be used for this purpose and preferably only hydrochloric acid is used.

The residue may also be washed or leached, e.g. with water, to remove non-zirconium containing products and especially to further reduce the level of alkali metal species, such as sodium salts, present in the residue.

Where the source of alkali metal is $Na_2CO_3$ minimal if any silica and alkali metal is leached from the AFDZ if it is leached directly with water. In such a case this direct water leaching step may be omitted and in such a case the AFDZ may be acidified or neutralised and the resulting product is then leached, preferably with water to reduce the level of alkali metal species in the form of alkali metal salts. Hydrochloric acid or sulphuric acid may be used for this purpose, preferably only hydrochloric acid. Preferably it is acidified or neutralised to a pH of between 4 and 6.

The main purposes of leaching the AFDZ is to reduce the alkali metal content thereof. The leached products can be exploited for by-product manufacture.

The ZBS may be formed by adding a stoichiometric quantity of a source of sulphate, preferably $H_2SO_4$ or acid zirconium sulphate tetrahydrate (AZST) to the washed, wet residue to convert the acid extractable zirconium to ZBS and thus forming solid ZBS in situ in the residue by heating the slurry at 80 to 90° C. for 10 to 15 minutes. The wet ZBS-containing residue may be dried or evaporated at a temperature of between 120° C. and 180° C., e.g. about 150° C. The ZBS-containing residue may then be purified, e.g. by washing it with acid at elevated temperatures, for example washing it with a hot (80° C. to 90° C.) HCl solution. Preferably, the HCl solution is in the form of an aqueous mixture of HCl and $HNO_3$, in proportions of about 8 g of concentrated HCl and 4 g of concentrated $HNO_3$ in a liter of water. In another preferred embodiment the mixture contained 30 g concentrated HCl and 4 g $HNO_3$ in a liter of water. More concentrated acid solutions, say up to 0.3N concentration could also be used but a larger percentage of zirconium is then dissolved along with the impurities. What has been established is that only a small volume of a higher acid concentration of wash solution is first added and brought to 80° C. to 90° C. before washing with the lower acid concentration acid solution is done, a very satisfactory result is obtained.

The in situ ZBS may also be formed in the presence of a small quantity of HCl at pH values close to 1.

The purified ZBS may then be converted to AZST, e.g. by mixing it with a stoichiometric quantity of $H_2SO_4$ to form a wet AZST-containing product. The wet AZST-containing product may be dried or roasted at a temperature of between 250° C. and 450° C., e.g. at about 350° C., and the AZST may be extracted with water to form an AZST-containing solution. Iron, uranium and calcium, in particular, are separated to a significant extent using this procedure, which is also suitable for the larger scale production of rather pure zirconium products from AFDZ. Thus, zirconia or other zirconium chemical products may then be prepared from the AZST-containing solution by methods known to those skilled in the art.

An important aspect of the formation of ZBS as described above is the non-costly subsequent containment for disposal of separated impurity elements, including radioactive elements. The acid wash solutions (pH approximately 1 or lower) from the purification of the Z-BS may be treated with a small quantity of ferric sulphate (in roughly twice equivalent amounts to that of the total impurities), heated and then made alkaline, preferably with ammonia ($NH_3$) or lime, to pH of greater than 8. Virtually all the impurity elements are thus brought down as a small volume precipitate which may be easily separated from the supernatant solution. The precipitate may be mixed with just enough lime to render an almost dry product, which can be calcined, if desired, for disposal.

Furthermore, the final washes used to further reduce the level of alkali metal in the wet residue as described above may also be added to the acid wash solution from the ZBS purification, before impurities are precipitated. The separated supernatant solutions may be directly disposed of.

It has been found that for NaOH as the alkali metal containing compound for increasing reaction or fusion temperatures between 650° C. and 850° C., increasing proportions of the zirconium in the zircon is acid extractable. For example, at a reaction or fusion temperature of 850° C., using NaOH as the alkali metal containing compound in mass ratio of 1:1 to the zircon, about 88% of the zirconium is acid extractable, whereas at 650° C. about 78% of the zirconium is acid extractable.

In one embodiment of the invention, once the solid ZBS has formed in situ, and was purified, the product formed may be dried to form a dried residue. The dried residue may also be calcined to form a zircon derived base material suitable for pigments.

According to another aspect of the present invention a process of producing zircon derived material suitable for pigments comprises:
- providing AFDZ formed from reacting zircon with a source of alkali metal at elevated temperatures;
- leaching the AFDZ to provide a leachate containing non-zirconium containing products, and a solid residue with an increased zirconium content;
- treating the residue in order to obtain in situ formation of ZBS as a solid in the residue;
- drying the ZBS-containing residue and calcining the dried ZBS-containing residue to form a calcined product which is a zircon derived material suitable for pigments.

The process may include the step of preparing of AFDZ and the AFDZ may be prepared as hereinabove described.

The AFDZ may be leached with water. The wet residue which forms may still include some alkali metal. The wet residue or AFDZ may be neutralised as described hereinbefore and washed with water until substantially all alkali metal has been removed, especially where hydrochloric acid was used during neutralisation.

During the washing step of the AFDZ, some silica present in the zircon may be leached from the AFDZ, particularly if the alkali metal containing compound is NaOH. The process may thus include mixing particulate silica with the calcined product to replenish at least some of the silica leached from the AFDZ.

The ZBS which forms in situ may be subjected to purification.

If necessary, the process may include a size reduction step, e.g. wet milling, to reduce the average particle size of the residue so that it is suitable for pigments.

The ZBS which forms in situ may be subjected to purification.

Drying of the wet residue may be effected at an elevated temperature of between 110° C. and 150° C., e.g. about 120° C.

Calcining of the dried residue may be effected at a temperature of between 800° C. and 1000° C., e.g. about 900° C., and preferably from 1 to 2 hours.

The leaching step of the AFDZ may include mixing the AFDZ with $NaHCO_3$ and water, the alkali salt in the alkali salt-containing liquid thus being $Na_2CO_3$. The $CO_2$ purging as hereinbefore described could also be used. In these cases, no or very little silica is washed or leached form the AFDZ, a wet residue which is produced thus containing substantially all of the silica that was present in the AFDZ. Preferably, at least 90% of the alkali metal salts present in the AFDZ is leached or washed form the AFDZ. More preferably, at least 95%, and typically at least 99% of the alkali metal salts present in the AFDZ is leached or washed from the AFDZ.

The zircon derived material is suitable for all zircon-type zirconium pigments, including V-blue, Pr-yellow and Fe-pink pigments.

If the acid extractable zirconium in the wet residue is converted in situ into zirconium basic sulphate (ZBS) the formation of a mixed-phase structure upon calcination to 900° C. in the absence of sodium salts is largely prevented, as confirmed by Raman spectroscopy. The acid extractable zirconium is largely converted into a prominently monoclinical zirconia form after calcination (typical composition (w %) 70% $ZrO_2$, 12.5% $Zr_2SiO_6$ and 17.5% $SiO_2$), when about 50% of the silica is leached from the AFDZ during the washing step, which permits the formation of greatly improved zirconium pigment colours, such as V-blue pigment colours. When no silica is leached from the AFDZ, the calcined base material has a typical composition by mass of about 56% $ZrO_2$, 13% $Zr_2SiO_6$, and 31% $SiO_2$. This approach has the advantage of not necessarily having to add any further silica to the calcined material when the pigments are produced.

Pigments may be prepared from the zircon-derived base material using any suitable method known to those skilled in the art.

According to another aspect of the present invention a process of beneficiating zircon to produce opacifier material comprises:
- providing AFDZ formed from reacting zircon with a source of alkali metal at elevated temperatures;
- leaching the AFDZ to provide a leachate containing non-zirconium containing products, and a solid residue with an increased zirconium content;
- treating the residue in order to obtain in situ formation of ZBS as a solid in the residue;
- purifying the ZBS containing residue by removing non-zirconium containing species; and
- calcining the purified ZBS-containing product thereby to produce opacifier material.

If desired, the process may include subjecting the opacifier material to a size reduction step, e.g. wet milling, to achieve a $d_{50}$ particle size of less than 1.5 µm. If wet milling is used, the opacifier material may subsequently be dried at a temperature of about 120° C.

Treating the wet residue to convert the acid extractable zirconium in the wet residue into ZBS may be effected as hereinbefore described. Purifying the ZBS-containing product may be effected as hereinbefore described.

The process may include the formation of AFDZ.

The AFDZ may be formed, and leached, as hereinbefore described. The process may include recovering at least some of the alkali from the wet residue as hereinbefore described. The process may include subjecting raw zircon to a size reduction step as hereinbefore described.

According to another aspect of the present invention a process of beneficiating zircon to increase the zirconium content thereof comprises the steps of:
- providing an alkali-fusion decomposed zircon product (AFDZ) formed from reacting zircon with a source alkali metal at elevated temperatures;
- treating the AFDZ to form a solution containing AZST;
- precipitating hydrated zirconium basic carbonate (ZBC) or hydrated zirconium oxide and soluble sulphates from the AZST solution;
- washing the precipitate to remove soluble sulphates;
- treating the washed precipitate in order to obtain in situ formation of solid zirconium basic sulphate (ZBS) thereon.

The method may include the step of forming the AFDZ, which AFDZ may be prepared as described hereinbefore.

The AZST solution may be prepared as described hereinbefore.

In one embodiment of the invention only a portion of the AZST may be converted to hydrated ZBC or hydrated zirconium oxide, while the other portion is used to convert the hydrated ZBC or hydrated zirconium oxide to ZBS. The portion of the AZST solution from which the ZBC is precipitated is typically about 70% to 80% with the remainder of the AZST solution mixed with the hydrated ZBC or hydrated zirconium oxide precipitate thus typically being 30% to 20% of the starting solution. When AZST is used, the ZBC may be stirred vigorously and the AZST may be added thereto. This mixture may be heated to between 80° C. and 90° C. and preferably it is maintained at this temperature for at least 10 minutes.

The AZST may be formed from the AFDZ as described hereinbefore. The final pH of the hydrated ZBC or hydrated zirconium oxide may be between 6.5 and 7, e.g. about 6.75 from the liquid phase. The hydrated ZBC or hydrated zirconium oxide may then be separated from the liquid phase and may be washed with water to remove soluble sulphates. The hydrated ZBC or hydrated zirconium oxide may be converted to the ZBS by reacting it with a source of sulphate such as $H_2SO_4$ or AZST and heating at 80° C. for at least 10 minutes.

The process may include drying the ZBS which forms, e.g. at a temperature of 150° C.

The process may also include purifying the ZBS as described hereinbefore. The purified ZBS may be converted to AZST.

The invention also relates to products of the processes substantially as described hereinabove.

In a preferred embodiment of the invention the AFDZ may be formed in a container or reactor by lining interior wall surfaces of the container or reactor with an inert composition; placing a mixture of zircon and a source of alkali metal inside the container or reactor so that the lining is between the mixture and the interior wall surfaces of the container or reactor; and allowing the mixture to react at an elevated temperature to form AFDZ.

The inert composition may comprise a refractory oxide, preferably a ceramic material, preferably a zirconium containing product. Preferably it comprises zircon powder or AFDZ.

Lining interior wall surfaces of the container or reactor may be effected by means of a suitable jig, which is then withdrawn prior to allowing the mixture to react at an elevated temperature.

Preferably the lining is a AFDZ lining and, the AFDZ lining is preferably between 3 mm and 8 mm thick. Most preferably, the AFDZ lining is about 5 mm thick. However, it is to be appreciated that the AFDZ lining thickness may vary depending on the size of the container or reactor, and may thus fall outside the range provided above.

Preferably, for elevated temperatures above 650° C., the AFDZ for use as lining is water leached, comminuted and dried. Alternatively milled zircon powder could be used which is easily removable from the solid AFDZ body, subsequently to a fusion.

The invention also relates to products formed by the processes as described hereinabove.

The invention will now be described, by way of example, with reference to FIG. 1 which shows a schematic flow diagram of a process in accordance with the invention.

Referring to the drawing, reference numeral 10 generally indicates a process in accordance with the invention for the beneficiation of zircon to increase the zirconium content thereof.

The process 10 includes a raw zircon solids feed line 12 leading to a milling stage 14, with a solids discharge line 16 leading to a reaction stage 18. From the reaction stage 18 an AFDZ feed line feeds a cooling and comminuting stage 22 from which a comminuted AFDZ feed line 24 leads to a leaching stage 26. A leachate treating stage 30 is connected by a leachate line 28 to the leaching stage 26, and an alkali metal recovery stage 34 is connected to the leaching stage 26 by means of a wet residue line 32.

An alkali metal depleted wet residue line 36 leads from the alkali recovery stage 34 to a neutralising stage 38 from where a neutralised wet residue line 40 feeds into a water washing stage 42. The water washing stage 42 is connected to a ZBS producing stage 46 by means of a washed wet residue line 44. A ZBS-containing product line 48 leads from the ZBS producing stage 46 to a drying/roasting stage 50, which is connected to an acid leaching stage 54 by means of a dry ZBS-containing product line 52.

An acid leached ZBS-containing product line 56 leads from the acid leaching stage 54 to an AZST producing stage 58. An AZST product containing line 60 leads to an AZST drying stage 62 which is connected to an AZST water extraction stage 66 by means of a dry AZST line 64. An AZST solution product line 68 leads from the AZST water extraction stage 66.

As shown in the drawing, the neutralised wet residue line 40 also leads to an in situ AZST producing stage 70 which is connected to an AZST drying/roasting stage 74 by means of an AZST containing product line 72. A dry AZST line 76 leads to a water extraction stage 78 which is connected to a ZBC precipitating stage 84 by means of an AZST solution line 82. The ZBC precipitating stage 84 has a ZBC containing product line 86 leading to a precipitate washing stage 88 from where a washed precipitate line 90 leads to a ZBC/AZST admixing stage 92. A ZBS slurry line 94 leads form the ZBC/AZST admixing stage 92 to a slurry during stage 96 from where a dry slurry line 98 leads to an acid leaching stage 100. A leached ZBS product line 102 leads from the acid leaching stage 100 to an AZST producing stage 104, with an AZST product line leading from the AZST producing stage 104.

The ZBS-containing product line 48 also leads to a wet residue milling stage 108, from which a wet milled residue line 110 leads to a drying/calcining stage 112. A calcined product line 114 leads from the drying/calcining stage 112 to a fine silica mixing stage 116 from which a zircon base material product line 118 leads.

The acid leached ZBS containing product line 56 also leads to a calcining stage 120 and to the wet residue milling stage 108. A calcined product line 122 leads from the calcining stage 120 to a wet milling stage 124, from which an opacifier product line 126 leads.

In accordance with the process 10, raw zircon solids are fed along the raw zircon solids feed line 12 to the milling stage 14, where it is milled to have an appropriate $d_{50}$ particle size. The milled zircon is discharged through the solids discharge line 16 to the reaction stage 18, where it is mixed with $Na_2CO_3$ and allowed to react at an elevated temperature of about 1000° C. to form AFDZ. A mass ratio between the zircon and the $Na_2CO_3$ is about 1:0.65. The AFDZ is fed along the AFDZ feed line 20 to the cooling and comminuting stage 22, where the AFDZ is cooled down and comminuted to a $d_{50}$ particle size of less than 1 mm. The cooled, comminuted AFDZ is fed along the comminuted AFDZ feed line 24 to the leaching stage 26, where it is leached with water. In the leaching stage 26, minimal silica and $Na_2CO_3$ is leached from the AFDZ. Instead of using $Na_2CO_3$ in the reaction stage 18, NaOH may be used in a mass ratio of zircon:NaOH of about 1:1.1. In this case, the reaction takes place at about 650° C., and about 66% of the silica and about 80% of the NaOH are leached from the AFDZ into the water. Leachate from the leaching stage 26 passes along the leachate line 28 to the leachate treating stage 30, where sodium silicates and/or precipitated silicas are produced from the leachate by methods known to those skilled in the art.

Wet residue from the leaching stage 26 is passed along the wet residue line 32 to the alkali metal recovery stage 34, where it is mixed at room temperature with $NaHCO_3$ to recover $Na_2CO_3$, in the form of a concentrated solution, form the wet residue leaving an alkali metal-depleted wet residue. The $Na_2CO_3$ can be precipitated and reused as the source of alkali metal in the reaction stage 18.

The alkali metal depleted wet residue leaves the alkali metal recovery stage 34 along the alkali metal deplete wet residue line 36 and enters the neutralising stage 38, where it is neutralised with HCl to a pH of about 5. Neutralised wet residue thus leaves the neutralising stage 38 along the neutralised wet residue line 40 and is passed to the water washing stage 42 for removal of sodium salts from the alkali metal depleted wet residue.

The washed wet residue is fed by means of the washed wet residue line 44 into the ZBS producing stage 46, where a calculated stiochiometric quantity of $H_2SO_4$ (or AZST) is added to the wet residue to convert acid extractable zirconium in the wet residue into solid hydrated ZBS in the residue. A ZBS containing product is thus passed along the ZBS containing product line 48 to the drying/roasting stage 50, where the ZBS containing product is heated at a temperature of about 80–90° C. for at least 10 minutes. The ZBS containing product moves along the ZBS containing product line 52 to the acid leaching stage 54, where the ZBS containing product is leached with an aqueous mixture of HCl and $HNO_3$ in proportions of about 8 g of concentrated HCl and 4 g of concentrated $HNO_3$ in a liter of water. The aqueous acid mixture is at a temperature of about 85° C.

An acid leached ZBS containing, product thus feeds into the AZST producing stage 58 by means of the acid leached ZBS containing product line 56. In the AZST producing stage 58, the acid leached ZBS containing product is treated with a calculated stiochiometric quantity of $H_2SO_4$ to convert the ZBS into AZST. The AZST is passed along the AZST product containing line 60 to the AZST drying stage 62 where it is dried at a temperature of about 350° C. The dry AZST moves along the dry AZST line 64 to the AZST water extraction stage 66, where the dry AZST is extracted with water to form an AZST solution product which is delivered through the AZST solution product line 68. The AZST solution may be further treated by methods known to those skilled in the art, to produce zirconia or other zirconium chemical products. Instead of going to the water washing stage 42, some or all of the neutralised wet residue from the neutralising stage 38 may be passed to the in situ AZST producing stage 70. In the in situ AZST producing stage 70 a calculated stiochiometric quantity of $H_2SO_4$ is added to the neutralised wet residue to convert acid extractable zirconium in the wet residue directly into AZST. The molar ratio of the $H_2SO_4$ to the acid extractable zirconium is about 2:1. An AZST containing product is thus passed along the AZST containing product line 72 to the AZST drying/roasting stage 74, where the AZST containing product is roasted at a temperature of about 350° C. [Alternatively (not shown) AFDZ from stage 22 may be converted directly into AZST by adding an excess (about 5% excess) $H_2SO_4$ to the AFDZ. In the process AZST and water soluble sulphates form. The formed product is then passed on to the drying/roasting stage 74 as before and processed further as described below.] Dry AZST is fed along the dry AZST line 76 to the water extraction stage 78, where the AZST is extracted from the solids into the water to form an AZST containing solution.

The AZST containing solution may then be further treated/purified by passing it along the AZST solution line 82 to the ZBC precipitating stage 84. In the ZBC precipitating stage 84, about 75% of the AZST solution is mixed with either a $Na_2CO_3$ solution or an $(NH_4)_2CO_3$ solution to obtain a final solution pH of about 6.75, thus precipitating ZBC and soluble sulphates from the solution. A ZBC containing product is then passed along the ZBC containing product or precipitate is washed thoroughly with water until it is free of soluble sulphates. The washed precipitate is passed along the washed precipitate line 90 to the ZBC/AZST admixing stage 92, where the remaining 25% of the AZST containing solution is vigorously stirred up with the ZBC containing precipitate and heated to a temperature of about 75° C. for a period of about 10 minutes, thus forming a ZBS slurry.

The ZBS slurry is passed along the ZBS slurry line 94 to the slurry heating stage 96 where it is heated at a temperature of about 80–90° C. for at least 10 minutes, whereafter it is fed to the acid leaching stage 100 along the dry slurry line 98. In the acid leaching stage 100, the ZBS product is treated in the same way as in the acid leaching stage 54, with a leached ZBS product thus being fed along the leached ZBS product line 102 to the AZST producing stage 104. In the AZST producing stage 104, AZST is produced in the same fashion as in the AZST producing stage 58, to produce an AZST product delivered through the AZST product line 106. The AZST product may be further treated if desired.

If it is desired to produce zircon derived base material suitable for pigments using the process 10, some or all of the ZBS-containing product (which is in the form of a wet residue) from the ZBS-producing stage 46 is passed along the ZBS-containing product line 48 to the wet residue milling stage 108, where the wet residue is wet milled to have an average particle size which is appropriate for pigments. Alternatively, acid leached ZBS-containing product from the acid leaching stage 54 is fed to the wet residue milling stage 108. As will be appreciated, if the alkali metal used in the reaction stage 18 is NaOH and not $Na_2CO_3$, at least 50% of the silica in the AFDZ is leached from the AFDZ in the leaching stage 26.

The milled residue is fed along the wet milled residue line 110 to the drying/calcining stage 112, where it is initially dried at a temperature of about 120° C., and then calcined at a temperature of about 900° C. The calcined product is thus fed along the calcined product line 114 to the fine silica mixing stage 116. In the fine silica mixing stage 116, the calcined product is mixed with fine particulate silica to replenish the silica initially leached from the AFDZ in the leaching stage 26. Zircon derived base material is thus delivered through the zircon derived base material product line 118 and can be used to prepare zirconium pigment.

In a variation of the above process for producing zircon-type base material suitable for pigments, the AFDZ from the cooling and comminuting stage 22 is mixed with $NaHCO_3$ and water in a washing stage 128, forming a $Na_2CO_3$-containing liquid and a wet residue. The wet residue thus contains substantially all of the silica that was present in the AFDZ, and the $Na_2CO_3$-containing liquid and a wet residue. The wet residue thus contains substantially all of the silica that was present in the AFDZ, and the $Na_2CO_3$-containing liquid includes 95% of the alkali salts, as $Na_2CO_3$, that were present in the AFDZ. The wet residue is then passed to the ZBS producing stage 46, from where the ZBS-containing product is fed to the wet residue milling stage 108 and the drying/calcining stage 112.

It will typically not be necessary to add fine silica to the calcined product, which is thus a zircon-derived base material suitable for zirconium pigment.

In order to produce opacifier material using the process 10 of the invention, acid leached ZBS containing product is fed along the acid leached ZBS containing product line 56 to the calcining stage 120 where it is calcined at a temperature of about 900° C. Calcined product passes along the calcined product line 122 to the wet milling stage 124, where the calcined product is wet milled to achieve a $d_{50}$ particle size of less than 1.5 µm. Thus, opacifier material is discharge through the opacifier product line 126 and may thereafter be dried at a temperature of about 120° C. in a drying stage (not shown).

The invention is further illustrated by the following non-limiting examples:

EXAMPLE 1

AFDZ was prepared using zircon powder with a $d_{50}$ particle size of 6.5 µm, using the fusion or reaction conditions listed in Table 1. In all instances a fusion time of 90 minutes was used. The AFDZ was cooled down before comminuting the solids to a particle size <1 mm. The comminuted AFDZ product for each run was individually water-leached and the water phases and solid wet extracted, the water phases were individually titrated with a standardised HCl solution with methyl orange as indicator. The percentages of alkali metal extracted, are given in Table 1. The neutralised solutions after the titrations were subsequently slightly acidified with HCl and then made alkaline with $NH_3$ to pH values of >10 for complete precipitation of their silica contents. The precipitates were separated, washed, dried and finally calcined at about 750° C. The percentages of the silica water-extracted from various fusion products, are also given in Table 1.

To determine the percentages of acid extractable zirconium in the various AFDZ samples, their wet residues (after water extraction) were each treated with 20 g concentrated sulphuric acid per 18.3 g of initial zircon used in the fusions, dried and the roasted about 350° C. From the roasted products the AZST formed were water-leached and the solutions separated from the remaining solid residues. The AZST solutions were all evaporated to dryness and solid AZST products calcined at 900° C. for 2 hours to $ZrO_2$ products and weighed.

The remaining solid residues from which the AZST solutions were separated, were also dried and then calcined, also at 900° C. for 2 hours. The percentages of acid extractable zirconium, also given in Table 1, were calculated from the $ZrO_2$ masses obtained. Good overall mass balance were found.

EXAMPLE 2

AFDZ was prepared using zircon powder with a $d_{50}$ particle size of 6.5 µm, using the fusion or reaction conditions noted below in Table 2. The AFDZ was cooled, comminuted to a particle size of less than 1 mm and water leached to provide a water phase and a wet residue. The wet residue was treated with $NaHCO_3$ to recover $Na_2CO_3$, in solution form, therefrom, whereafter the wet residue was neutralised with HCl using methyl orange as an indicator (colour change from yellow to red). The wet residue was washed with water to remove sodium salts. $H_2SO_4$ was added in a stoichiometric quantity to the wet residue to convert acid extractable zirconium in the wet residue into ZBS. Following the in situ precipitation of solid ZBS the wet residue was evaporated to almost dryness at 120° C., and then twice acid washed with 150 ml of each acid solution (containing 8 g concentrated HCl and 4 g concentrated $HNO_3$ in a liter of water). Additional $H_2SO_4$ was added to form AZST from the in situ formed ZBS before roasting for 1 hour at 350° C. The AZST was dissolved in $H_2O$, dried and then calcined to $ZrO_2$ at 900° C. for 2 hours before XRF analysis. $ZrO_2$ yield was approximately 68%. The results obtained are given in Table 2, column a. In column b of Table 2, the analysis is given for $ZrO_2$ derived from the same AFDZ material but following a conventional route of zirconyl chloride from which ZBS is precipitated using $(H_4)SO_4$ as precipitating agent. The ZBS was separated, washed with water, then dried, calcined to $ZrO_2$ at 900° C. and also analysed by XRF. The yield was the same as for the in situ ZBS procedure above.

An AZST solution was prepared from the AZST obtained from the in situ ZBS route above. The solution was adjusted to 6 N HCl and then passed through a pre-equilibrated (with 2N $H_2SO_4$/6N HCl solution) strong anion exchange resin column (resin Duolite A161L Code 60393, obtained from Rohm and Haas, South Africa (Pty) Ltd). The eluate was dried and then calcined at 900° C. Instead of a column separation, a single batch equilibrium was also done with pre-equilibrated strong anion exchange resin (10 g resin/ AZST derived from 18.3 g original zircon used). After 5 minutes stirring, phases were separated and the solution dried and the calcined at 900° C. The XRF analyses for these further purifications are given in columns c and d, respec-

TABLE 1

Leachate values, in percentages extracted, of alkali metal and silica extracted with water and zirconium extracted with $H_2SO_4$ from alkali-fusion decomposed zircon with sodium hydroxide and sodium carbonate as the alkali metal containing compound at various fusion or reaction temperatures and zircon:alkali metal containing compound mass ratios.

| Zircon:alkali-metal mass ratio and alkali metal compound used | Fusion Temperature | | | | | | | | |
|---|---|---|---|---|---|---|---|---|---|
| | 650° C. | | | 850° C. | | | 1050° C. | | |
| | Component Extracted (%) | | | | | | | | |
| | NaOH | SiO$_2$ | Zr | NaOH | SiO$_2$ | Zr | NaOH | SiO$_2$ | Zr |
| 1.1 (NaOH) | 80 | 63 | 77.5 | 85 | 70 | 88 | — | — | — |
| 0.87 (NaOH) | 80 | 57 | 71.5 | 75 | 63 | 86 | 55 | 42 | 53.2 |
| 0.66 (NaOH) | 80 | 42 | 58.2 | 60 | 45 | 77 | 33 | 13 | 57 |
| 0.44 (NaOH) | 80 | 22 | 48.2 | 45 | 18 | 68 | 18 | 2.5 | 68.8 |
| 0.66 (Na$_2$CO$_3$) | — | — | — | — | — | — | Minimal | minimal | 62 | tively, of Table 2, from which it is clear that such further purifications are hardly necessary.

TABLE 2

Comparison of the compositions of zirconium products obtainable from alkali-fused zircon by the in situ ZBS process involving acid leaching with that obtained from a conventional process involving precipitation of ZBS from zirconyl chloride. The purities after purification of AZST ziconium products, using strong anion exchange resins, are also given. The purities obtained from ZBS (derived from AZST) after purification is given as well as that of an opacifier derived from the in situ ZBS process.
XRF analyses of $ZrO_2$ products derived from the various experiments and also of a purified opacifier.

| Component | a | b | c | d | e | f |
|---|---|---|---|---|---|---|
| $ZrO_2HfO_2$ | 99.5% | 99.0% | 99.5% | 99.5% | 99.5% | 78.95% |
| $SiO_2$ | <0.4% | 0.65% | <0.2% | <0.4% | <0.45% | 21.09% |
| Ti ppm | 710 | 633 | 235 | 699 | 278 | 694 |
| Fe ppm | 250 | § | § | 87 | 206 | 108 |
| Ca ppm | <60 | 276 | <30 | 65 | 127 | 100 |
| P ppm | 234 | 608 | 213 | 236 | 289 | 240 |
| U ppm | 40 | § <10 | § <18 | <24 | <20 | 81 |
| Th ppm | 131 | <24 | 120 | 121 | 109 | 105 |

The zircon:alkali metal containing compound mass ratio for all the experiments was 0.87 and the fusion temperature 650° C. NaOH was used as alkali metal containing compound. The composition of the milled zircon starting material was as follows: $ZrO_2+HfO_2$: 65.7%, $SiO_2$:33.6%, ppm Ti:738, ppm Fe:683, ppm Ca:666, ppm P:455, ppmU:331 and ppm Th:144. § designates below detection limit of XRF (X-ray fluorescence spectroscopy).

EXAMPLE 3

Acid extractable zirconium in the wet residue, washed with water to remove sodium salts, as prepared in Example 2, was converted to AZST by adding a calculated stiochiometric quantity of $H_2SO_4$ thereto to form an AZST-containing product. The AZST-containing product was roasted to dryness at a temperature of about 350° C., whereafter it was dissolved in water to form an AZST-containing solution. A $Na_2CO_3$ solution was added to about 75% of the AZST-containing solution to precipitate hydrated zirconium basic carbonate (ZBC) therefrom. The final pH of the mixture was about 6.75. The precipitated hydrated ZBC was separated from the supernatant and thoroughly washed with water until was free of soluble sulphates. The ZBC precipitate was vigorously stirred up with the remaining 25% of the AZST-containing solution and the mixture was heated for about 10 minutes at a temperature of about 85° C., to in situ form a ZBS-containing slurry directly from the ZBC. The ZBS-containing slurry was purified with $HCl/HNO_3$ solutions as described in Example 2 above. The ZBS was converted to AZST as described in Example 2 above and calcined to $ZrO_2$ at 900° C. for two hours before XRF analysis. The XRF analysis for the $ZrO_2$ is given in column e of Table II. The $ZrO_2$ yield in this example was also about 68%.

EXAMPLE 4

AFDZ was prepared using zircon flour (95%<45 μm) and NaOH and the fusion or reaction conditions of Table 2. The product was further treated exactly the same as was done in Example 2 and reported in column a up to the point before additional $H_2SO_4$ is added to obtain AZST. After the acid purification washes with $HCl/HNO_3$, the wet residue containing the in situ ZBS precipitate was oven dried, calcined at 900° C., wet milled to a $d_{50}$ particle size of less than 1.5 μm and dried at about 120° C. The $d_{50}$ particle size of the resulting material measured 1:33 μm with a radioactivity level of below 10 Beq/g. An opacifier test revealed opacification properties similar to that of a super fine opacifier grade marketed by the Ferro company in South Africa. An XRF analysis of the opacifier is given in Table 2, column f. The mass yield for this opacifier was 83% based on the starting mass of the zircon flour used.

EXAMPLE 5

The efficacy of an 'inert' layer of dried water-leached comminuted AFDZ material between a mixture of zircon and alkali metal and interior wall surfaces of a fusion container or reactor for preventing difficulties in removing AFDZ product form the container subsequent to a fusion was tested. From experience it is known that for a zircon: alkali metal mass ratio of nearly 1:1 at a fusion temperature of 875° C. very hard fusion products result which are also cemented to the interior contact surface of the container to such an extent that it is very difficult to remove the fusion products from the container, especially after it has been allowed to cool down.

For the above test partitioning plate jigs were made which permitted AFDZ layer thicknesses of 3.5 and 8 mm to be filled into a concentric space adjacent to vertical wall of the fusion containers of the three runs of Example 1. Bottom surfaces of the fusion containers were also filled to the same depth. The fusion mixtures were then thrown in and tapped to rather rigid consistencies. The jigs were vertically withdrawn and by observation no displacement of the 'inert' layers appeared to have taken place. For the fusion conditions mentioned in Example 1 above, it was found subsequent to the fusions that all the contents of the container, even after cooling, could be easily removed by simply overturning the container. Only noticeable interaction between the fusion mixture and the inert material seemed to have taken place at a few localities in the experiment which used the 3 mm AFDZ layer thickness.

The Applicant believes that the invention, as illustrated, provides more rapid chemical procedures for deriving zirconium products of enhanced utility and/or of improved purity compared to conventional methods. The processes of the invention maximises recovery of byproducts and significantly removes impurity elements, particularly iron, uranium and calcium, thus also the long lived radium daughters of uranium and thorium. The zircon derived base material produced by the process of the invention can be used for zirconium pigment to produce very acceptable colours consistently. Since the processes of the invention allows relatively course material such as zircon flour to be treated chemically to produce upgraded zirconium-containing products requiring only the minimum of final milling, the radiological problem associated with the milling of zircon to produce very fine powders, as is required for opacifier applications, can be greatly be alleviated.

The invention claimed is:

1. A process of forming basic zirconium sulphate (ZBS) comprising:
   (a) providing an alkali-fusion decomposed zircon product (AFDZ) formed from reacting zircon with a source of alkali metal at elevated temperatures;

(b) treating the AFDZ to form a solid containing a hydrated zirconium product in the form of hydrated zirconium oxide and/or hydrated zirconium basic carbonate by:
  (i) leaching the AFDZ to provide a leachate containing non-zirconium containing products, and a solid residue containing the hydrated zirconium product; or
  (ii) reacting the AFDZ with a source of sulphate to form an acid zirconium sulphate tetrahydrate (AZST) solution, and thereafter precipitating from the AZST solution a solid containing at least one of a hydrated zirconium basic carbonate (ZBC) and a hydrated zirconium oxide; and
(c) adding a source of sulphate to the solid hydrated zirconium product to obtain in situ formation of ZBS as a solid.

2. The process of claim 1 wherein the hydrated zirconium product is prepared by reacting the AFDZ with a source of sulphate to form the AZST solution; and thereafter precipitating the ZBC and/or precipitating the hydrated zirconium oxide from the AZST solution.

3. The process of claim 2 wherein the AZST solution is formed by reacting the AFDZ with a source of sulphate to form the AZST in the solid which contained the AFDZ; and then leaching the AZST containing solid to extract the AZST into solution.

4. The process of claim 2 wherein hydrated ZBC is precipitated from the AZST solution, and which hydrated ZBC is precipitated by adding a carbonate to the AZST solution.

5. The process of claim 1 wherein the solid hydrated zirconium product is formed by leaching the AFDZ with water to provide a leachate containing non-zirconium containing products, and a solid residue containing the hydrated zirconium oxide.

6. The process of claim 1 wherein the solid hydrated zirconium product is treated by adding a source of sulphate selected from the group consisting of $H_2SO_4$ and AZST thereto, thereby in situ forming solid ZBS thereon.

7. A process of beneficiating zircon by separating non-zirconium containing products therefrom comprising:
(a) providing an alkali-fusion decomposed zircon product (AFDZ) formed from reacting zircon with a source of alkali metal at elevated temperatures;
(b) leaching the AFDZ to provide a leachate containing non-zirconium containing products, and a solid residue containing a hydrated zirconium product; and
(c) adding a source of sulphate to the residue in order to obtain in situ formation of basic zirconium sulphate (ZBS) as a solid in the residue.

8. The process of claim 7 which includes the step of forming AFDZ by reacting zircon with a source of alkali metal at elevated temperatures and wherein the source of alkali metal comprises a compound selected from the group consisting of NaOH and $Na_2CO_3$.

9. The process of claim 7 wherein the leaching comprises leaching the AFDZ with water.

10. The process of claim 9 wherein the water leached AFDZ is acidified to a pH between 4 and 6 and then leached with water to remove non-zirconium containing products.

11. The process of claim 7 wherein the ZBS is formed by adding a stoichiometric quantity of a source of sulphate to the leached residue to form a mixture of the leached residue and the source of sulphate and heating the mixture.

12. The process of claim 11 wherein the source of sulphate comprises a compound selected from the group consisting of $H_2SO_4$ and AZST; and the mixture of the leached residue and source of sulphate then being heated at a temperature from 80 to 90° C. for at least 10 minutes.

13. The process of claim 7 wherein the ZBS is purified by washing it with acid at elevated temperatures.

14. A process of producing zircon derived material suitable for pigments comprising:
(a) providing an alkali-fusion decomposed zircon product (AFDZ) formed from reacting zircon with a source of alkali metal at elevated temperatures;
(b) leaching the AFDZ to provide a leachate containing non-zirconium containing products, and a solid residue containing a hydrated zirconium product;
(c) adding a source of sulphate to the residue in order to obtain in situ formation of basic zirconium sulphate (ZBS) as a solid in the residue;
(d) drying the ZBS-containing residue and calcining the dried ZBS-containing residue to form a calcined product which is a zircon derived material suitable for pigments.

15. The process of claim 14 wherein the ZBS containing residue is purified prior to drying and calcining said residue.

16. The process of claim 14 wherein the ZBS containing residue is subjected to a size reduction step to reduce the average particle size of the residue so that it is suitable for pigments.

17. A process of beneficiating zircon to produce opacifier material comprising:
providing an alkali-fusion decomposed zircon product (AFDZ) formed from reacting zircon with a source of alkali metal at elevated temperatures;
leaching the AFDZ to provide a leachate containing non-zirconium containing products, and a solid residue containing a hydrated zirconium product;
adding a source of sulphate to the residue in order to obtain in situ formation of basic zirconium sulphate (ZBS) as a solid in the residue;
purifying the ZBS containing residue by removing non-zirconium containing species; and
calcining the purified ZBS containing product thereby to produce opacifier material.

18. The process of claim 17 which includes subjecting the opacifier material to a size reduction step, to achieve a $d_{50}$ particle size of less than 1.5 µm.

19. A process of beneficiating zircon by separating non-zirconium containing products therefrom comprising:
providing an alkali-fusion decomposed zircon product (AFDZ) formed from reacting zircon with a source alkali metal at elevated temperatures;
reacting the AFDZ with a source of sulphate to form an acid zirconium sulphate tetrahydrate (AZST) solution;
precipitating hydrated zirconium basic carbonate (ZBC) or hydrated zirconium oxide and soluble sulphates from the AZST solution;
washing the precipitate to remove soluble sulphates; and
adding a source of sulphate to the washed precipitate in order to obtain in situ formation of basic zirconium sulphate (ZBS).

* * * * *